United States Patent
Gehrig et al.

(10) Patent No.: US 8,104,699 B2
(45) Date of Patent: Jan. 31, 2012

(54) PROCESS AND DEVICE FOR DEHUSKING CEREAL GRAINS

(75) Inventors: Klaus Gehrig, Steinheim-Höpfigheim (DE); Hans-Jörg Menger, Reilingen (DE); Urs Keller, Seuzach (CH)

(73) Assignee: Buehler AG, Uzwil (CH)

( * ) Notice: Subject to any disclaimer, the term of this patent is extended or adjusted under 35 U.S.C. 154(b) by 183 days.

(21) Appl. No.: 12/298,471

(22) PCT Filed: Oct. 9, 2006

(86) PCT No.: PCT/CH2006/000553
§ 371 (c)(1),
(2), (4) Date: Oct. 24, 2008

(87) PCT Pub. No.: WO2007/121594
PCT Pub. Date: Nov. 1, 2007

(65) Prior Publication Data
US 2009/0123622 A1    May 14, 2009

(30) Foreign Application Priority Data
Apr. 25, 2006 (DE) .................. 10 2006 019 609

(51) Int. Cl.
*B02B 5/00* (2006.01)
(52) U.S. Cl. .......................................................... 241/6
(58) Field of Classification Search ................ 241/6–13, 241/247, 260, 261.1
See application file for complete search history.

(56) References Cited

U.S. PATENT DOCUMENTS

| 3,647,473 | A | 3/1972 | Stowell et al. |
| 3,708,002 | A | 1/1973 | Collier et al. |
| 5,036,757 | A | 8/1991 | Mueller |
| 7,246,762 | B2 * | 7/2007 | VanHouten et al. ............. 241/6 |
| 2006/0147591 | A1 | 7/2006 | Eugster et al. |

FOREIGN PATENT DOCUMENTS

| DE | 2023 368 | 11/1970 |
| DE | 2113 912 | 10/1971 |
| DE | 24 14 978 | 8/1975 |
| DE | 32 11 332 A1 | 10/1983 |
| DE | 38 09 026 A1 | 2/1989 |
| DE | 44 28 978 A1 | 3/1995 |
| DE | 44 11 443 A1 | 10/1995 |
| EP | 0 849 356 A2 | 6/1998 |
| GB | 805718 | 12/1958 |
| GB | 1 472 573 | 5/1977 |
| GB | 2294943 | 5/1996 |
| JP | 56068384 | 6/1981 |
| WO | 01/21012 A1 | 3/2001 |

* cited by examiner

*Primary Examiner* — Faye Francis
(74) *Attorney, Agent, or Firm* — Greenblum & Bernstein, P.L.C.

(57) ABSTRACT

The invention relates to a method and a system for dehusking grains, in particular for removing the spelts and/or the seed coat and the germ bud of grains and/or of malted grains and its processing in the brewing industry. The outer layers/shells are removed from cleaned and malted distiller's grains in a husking machine.

10 Claims, 2 Drawing Sheets

PROCESS AND DEVICE FOR DEHUSKING CEREAL GRAINS

BACKGROUND OF THE INVENTION

1. Field of the Invention

Figure 1:
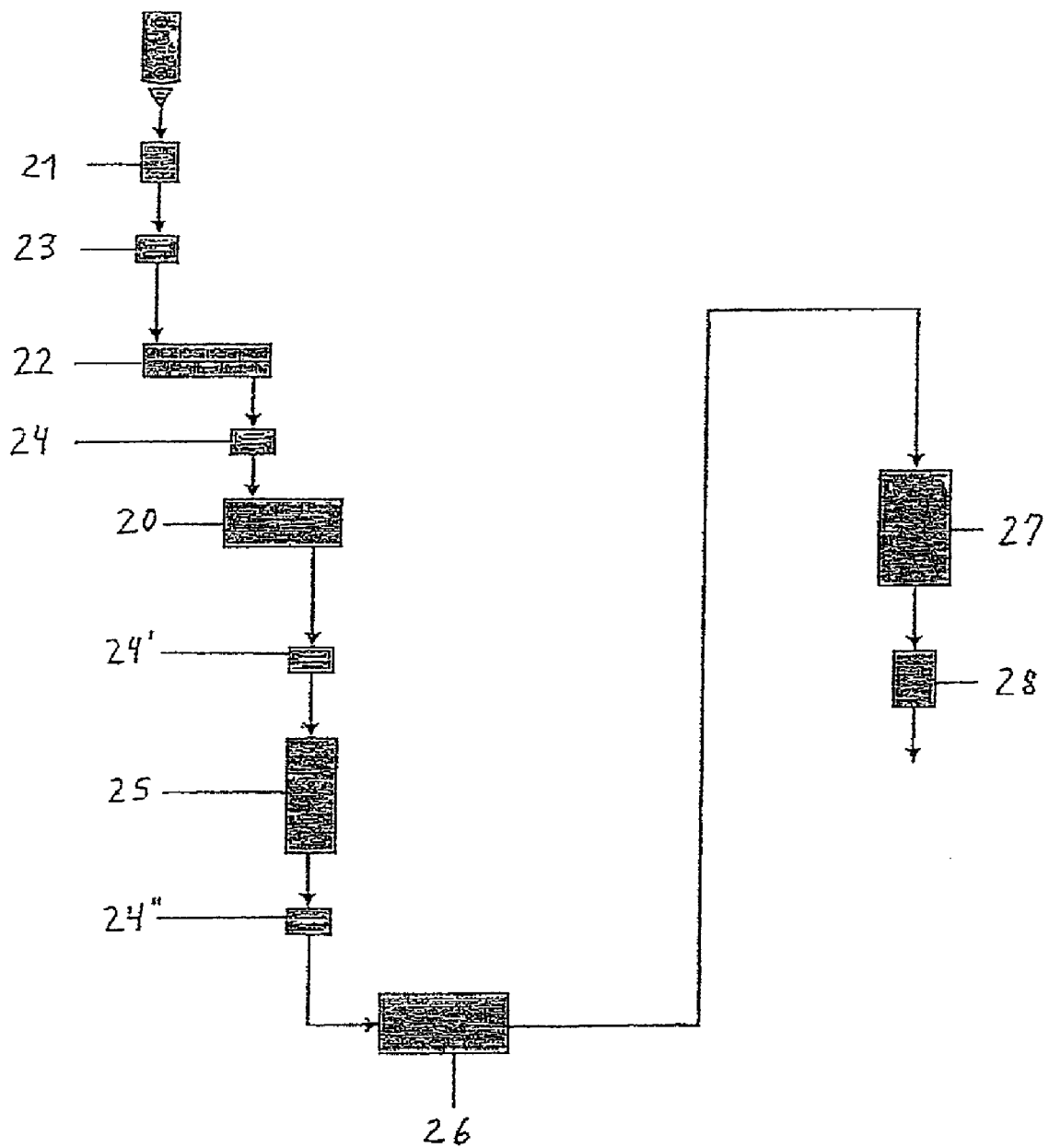

The invention relates to a process and a device for dehusking cereal grain, especially for removing the husks and/or the seed coats as well as the germ from grain and/or from malted grain and its processing in the brewing industry.

2. Background Information

Before malting or immediately before processing in the brewing process, according to the prior art, grain can be separated while wet and/or dry from the husk and/or from the seed coat as well as from the germ, and thus also be cleaned of original contaminants and/or harmful substances on the grain surface. In previous decades, dry cleaning has become the generally established method. Thus, CH-A-640750 describes a process in which the grains are subject to dry cleaning including scouring and aspiration. Then the grains are wetted and stored in conditioning cells for several hours. After conditioning, the grain is shelled immediately before the first grinding pass. Here the shelling may be preceded by a further conditioning. This is done depending on the degree of shelling and/or the tenderness of the grains following the moistening and conditioning.

It is also known how to polish cereal grains up to the point where they are released from the pericarp and the endosperm is exposed (EP-B-218012). For this the pericarps are removed incrementally in several polishing stages, during which moisture is added to the grains in at least one stage. The moistened grains may also be heated. After the heating, which may be done concurrently with moistening, the grains are dried and cooled. According to EP-B-529843 moistened and polished wheat grains are cleaned once more. This cleaning is a wet cleaning, in order to remove bran particles which are still adhering, especially from the crease as well. The grinding of malt on rice polishing machines is also known.

Similarly known is the scouring of grains to reduce the microflora of the husks/seed coats, as well as the grinding of grains.

Just as familiar are grain grinding machines with a vertically oriented rotor, e.g., according to EP-B-742048, in which the grain to be ground can additionally have air blown through and be moistened with water.

In the so-called PeriTec process, too, the outer cell layers, including the aleurone layer, are abraded away. Wheat is cleaned and moistened in a similar way to conventional processes, however one can omit the use of scouring machines. Before the polishing, moistening is again carried out in a controlled manner. The purpose of this is to release the outer from the inner layers, they then being rubbed away to below the testa. In a first stage the bran is abrasively removed in a vertical grinding machine, and in a second stage by frictional polishing. By this means it should be possible to drastically reduce the steep times after moistening prior to the milling. The penetration time of the water for softening should be only c. 30 minutes. At the same time pollutants are reduced. The grinding does not allow the germ to be removed.

Several methods are also known where the brewer's grain is dehusked or shelled after a malting or a kiln drying, e.g., according to DE-A-4428987, DE-A-3211332 or WO-A-01/21012.

SUMMARY OF THE INVENTION

The invention has the intended purpose of creating a process and a device for dehusking cereal grain, especially for removing the husks and/or the seed coats as well as the germ from grain and/or from malted grain and its processing in the brewing industry. Here the removal of the said grain components should also lead to an improvement in flavor of the brewing product.

According to the invention the task is done by taking the cleaned, moistened and/or malted brewer's grains and then immediately shelling them.

The husks can be removed completely.

After the shelling, the brewer's grains are crushed in a further stage of the process.

Where necessary, a further grinding and possibly also polishing of the grain surfaces can be done after the shelling.

Basically such a shelling process for bread cereal grains (see Suntory) is already known, although the grains are wetted again before the shelling in order to avoid a faulty processing. To alter this process for brewer's grains in the invention does not suggest itself.

Malted barley and/or other brewer's raw materials must be completely dehusked before further processing and the underlying plumule has to be removed.

The husks and/or seed coats, as well as the germ buds, which are removed in the process according to the invention, contain, besides the water-insoluble cellulose, also water-soluble substances such as husk polyphenols, bitter agents, lipids, silicates and protein components, an excessive transfer of which into the mash is disadvantageous for color, flavor and the physical/chemical keeping quality of the beer.

Because the husks have a certain elasticity, this can lead to a greater energy requirement for mechanical comminution in the crushing process.

In a crushing process according to prior art, if the husks are subject to too severe mechanical stresses during the grinding they break up, and this has a negative effect on the subsequent lautering process, especially where a straining vat is used for solid/fluid separation; and in addition to this the transfer of substances into the mash is increased because of the larger reactive surface area.

From the standpoint of quality, one advantage for the process of separating the husks could be a returning back of high-quality (still whole) husks into the process at a later time, which can result in advantages for the filtering and for the quality.

A further variant according to the process in the invention, is to fine mill the shelled raw material using a Dispax/hammer mill, preparing it for the filtering process which uses a mash filter.

There are advantages with regard to kinetics, quantity of produce, quality, reduced energy usage during milling.

A further advantage of the way the invention removes husks and/or seed coats as well as the germ, is seen in the reduction in pollutants in the layers near the surface on virgin grains and/or malted grains.

The shelling process according to the invention can be used for virgin brewer's grains as well as for malted brewer's grains. Apart from considerations of quality, which relate to the removal of the husks and/or seed coats and of the germ, it is possible to achieve a lower content of pollutants in the grain particles to be crushed. The husk fraction which is removed can be passed on for a specific processing and evaluation, and/or some portion of it can be re-introduced into the mashing process at a later time. As an alternative to shelling, a thorough grinding or a scouring of the grain surface is possible. This type of procedure has an effect on the quality of the grain and/or malt as well as the quality of the mashing process.

A further feature of the invention is to produce an apparatus for dehusking cereal grain, especially for removing the husks and/or the seed coat as well as the germ from cereal grain and/or from malted cereal grain.

BRIEF DESCRIPTION OF THE INVENTION

Figure 2:
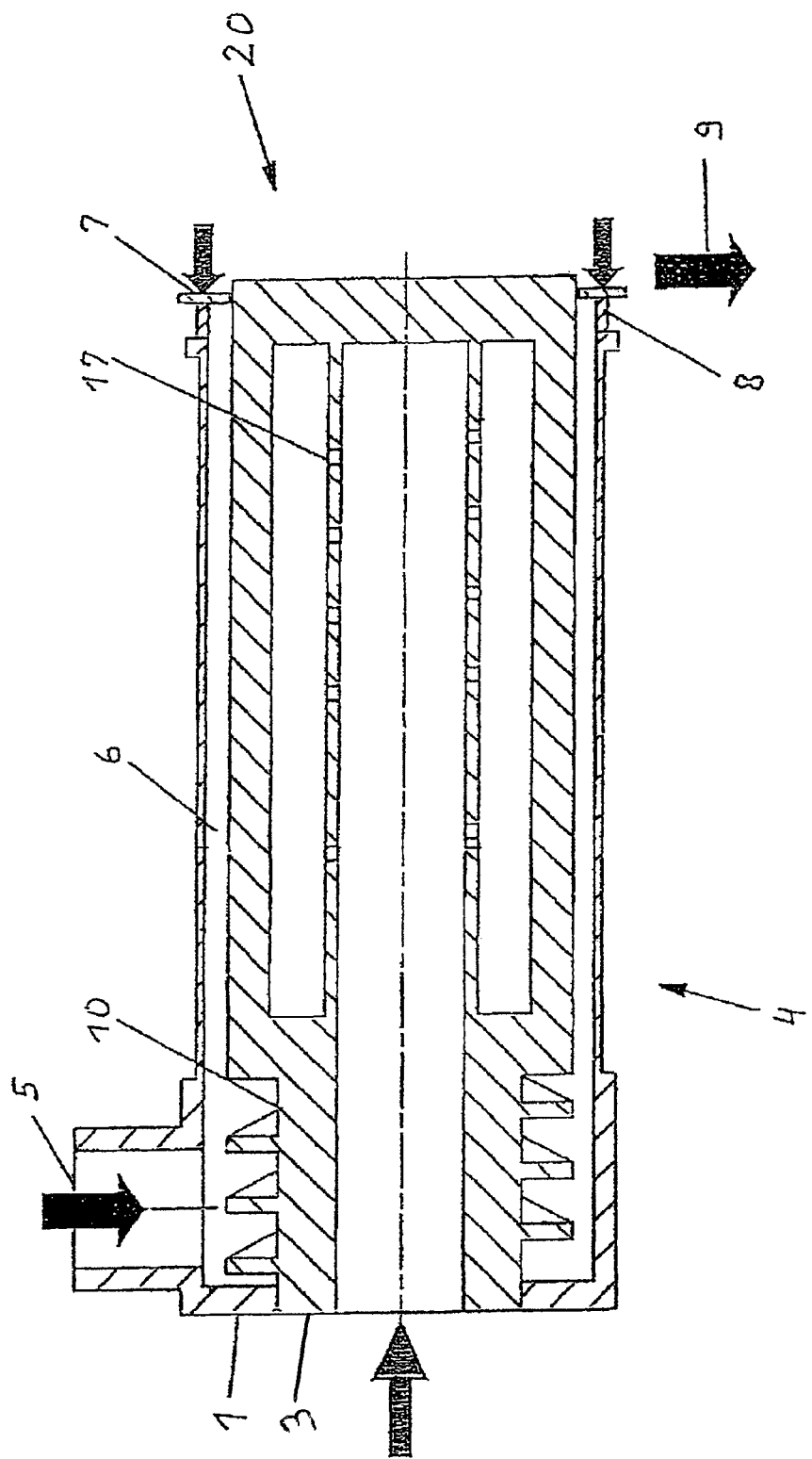

The invention will now be described in more detail in one embodiment, with the aid of a drawing. In the drawing are shown:

FIG. 1: a flow diagram;
FIG. 2: a shelling machine.

DETAILED DESCRIPTION OF THE INVENTION

The raw material which is to be processed in the brewing process is passed from cells which are not shown, into a volumetric filler 21, from here on to a magnet 23 and finally into a shelling machine 20, where the barley is shelled with a shelling percentage of c. 4%. A stream of air is blown through the barley during the shelling.

The shelled barley is passed through an aspirator 22.

The barley which has been cleaned and prepared in this manner is temporarily stored in a hopper 27 and passed via a volumetric filler 28 to the crushing process, starting with the first crush. The second crushing stage follows immediately, without an intervening inspection.

The stator 1 of the shelling machine 20 has a housing 2 which encloses a rotor 3 mounted inside it on a bearing, and which is mounted on a frame which opens downward via an adjoining outlet with slats 4. The rejected portion of shell powder and shell components is led off via these outlet slats.

From a product inlet 5 the barley grains are passed via a feed screw 10 into the processing zone 6. During the shelling the barley grains are led up against an adjustable catchment device 7, in order to build up a specific working pressure in the processing zone 6. The shelled barley grains leave the processing zone 6 through an adjustable outlet opening 8 and through an outlet 9 of the shelling machine 20.

The processing zone 6 is formed, on the side where the stator is, of two sifting baskets, in such a way that they completely enclose the rotor 3 in the axial direction. The rotor 3 is formed of a cast iron roller with a hollow shaft. The roller has slits in it which are arranged equidistantly around the circumference of the roller, and extend along the whole length of the processing zone 6.

The sifting baskets are made up of individual sifting plates.

The hollow shaft has a number of openings for the exit of air. The air passes further through the slits in the roller to the processing zone 6, and helps to separate shell fragments etc. from the barley grains. The air is forced into the hollow shaft by a fan.

REFERENCE SYMBOLS 1 stator
2 housing
3 rotor
4 outlet slats
5 product inlet
6 processing zone
7 catchment device
8 outlet opening
9 outlet
10 feed screw
20 shelling machine
21 volumetric filler
22 aspirator
23 magnet
27 hopper
28 volumetric filler

The invention claimed is:

1. A process for dehusking brewer's grain, said process comprising:
providing a shelling machine comprising a rotor and a stator and processing zone formed between said rotor and said stator, said rotor comprising slits for conveying air into said processing zone;
cleaning said grain;
malting said grain;
surface-processing said grain;
said surface-processing comprises shelling said grain, wherein said shelling is performed in said shelling machine; and
conveying air through the slits of said rotor to the processing zone for separation of shell fragments of said grain during shelling.

2. A process according to claim 1, further comprising:
abrading the surface of said grains after said shelling.

3. A process according to claim 1, further comprising:
abrading and polishing the surface of said grains after said shelling.

4. A process according to claim 1, further comprising:
removing plumule during said shelling.

5. A process according to claim 1, wherein:
during said shelling, the process comprises producing a husk fraction;
the process further comprises separating out the husk fraction; and
during a filtering process, feeding back the husk fraction.

6. A process according to claim 1, further comprising:
after said shelling, crushing the shelled grain.

7. A process according to claim 6, wherein:
said crushing is a wet crushing.

8. A process according to claim 6, wherein:
said crushing is a dry crushing.

9. A process according to claim 1, further comprising:
after said shelling, crushing the shelled grain in a two-stage crush.

10. A process according to claim 1, further comprising:
separately removing a residual extract from the husks.

* * * * *